United States Patent [19]
Irie et al.

[11] 4,063,987
[45] Dec. 20, 1977

[54] FORMING APPARATUS FOR A BREAKER LAYER TO BE USED IN A RADIAL TIRE

[75] Inventors: Nobuhiko Irie; Hideaki Katayama, both of Nagasaki, Japan

[73] Assignee: Mitsubishi Jukogyo Kabushiki Kaisha, Tokyo, Japan

[21] Appl. No.: 668,747

[22] Filed: Mar. 19, 1976

[30] Foreign Application Priority Data

Mar. 31, 1975 Japan .................................. 50-37786

[51] Int. Cl.$^2$ ........................................... B29H 17/28
[52] U.S. Cl. .............................. 156/417; 152/361 FP; 156/128 N; 156/133
[58] Field of Search ........... 156/400, 123, 124, 128 R, 156/128 I, 133, 202, 216, 223, 227, 394, 400, 402, 414–420, 446, 447, 477, 479, 480, 481; 152/361, 361 FP

[56] References Cited

U.S. PATENT DOCUMENTS

| | | | |
|---|---|---|---|
| 2,982,328 | 5/1961 | Emanueli et al. | 156/128 I |
| 3,121,652 | 2/1964 | Borglin et al. | 156/417 |
| 3,151,013 | 9/1964 | Nebout | 156/414 |
| 3,237,199 | 2/1966 | Brey | 156/400 |
| 3,503,829 | 3/1970 | Menell et al. | 156/133 |
| 3,525,655 | 8/1970 | Wood et al. | 152/361 |
| 3,580,770 | 5/1971 | Dyal | 156/216 |
| 3,813,271 | 5/1974 | Riggs | 156/128 R |
| 3,831,657 | 8/1974 | Dillenschneider | 152/361 FP |
| 3,862,871 | 1/1975 | Held et al. | 156/415 |
| 3,966,536 | 6/1976 | Schmitt | 156/416 |

FOREIGN PATENT DOCUMENTS

1,284,081 11/1968 Germany .................. 156/414

Primary Examiner—Charles E. Van Horn
Assistant Examiner—John E. Kittle
Attorney, Agent, or Firm—Cushman, Darby & Cushman

[57] ABSTRACT

An improved forming apparatus for a breaker layer to be used in a radial tire is described herein. The apparatus essentially comprises a drum device (D), a press contact device (A), first and second breaker material folding-wrapping devices (B) and (C), means for rotating said drum device (D), and means for moving said respective devices (A), (B) and (C) in the axial direction relative to said drum device (D) and for fixing them at predetermined positions. The drum device (D) includes a plurality of segments which have a width of their outer circumferential surfaces approximately equal to the width of the breaker layer to be formed, which can form a substantially cylindrical press contact surface with their outer circumferential surfaces, and which can expand and contract the diameter of said cylindrical contact surface. The press contact device (A) also includes a plurality of segments which can be displaced radially inwards and outwards, and which form a substantially cylindrical press contact surface with their inner circumferential surface concentrically with the cylindrical press contact surface of said drum device (D) when they are displaced inwards. The first and second breaker material folding-wrapping devices (B) and (C) are disposed symmetrically on the opposite sides of said drum device (D) and concentrically with said drum device (D). Each of the devices (B) and (C) is movable in an axial direction and includes a plurality of segments which can displace radially inwards and outwards and which are movable in the axial direction.

3 Claims, 6 Drawing Figures

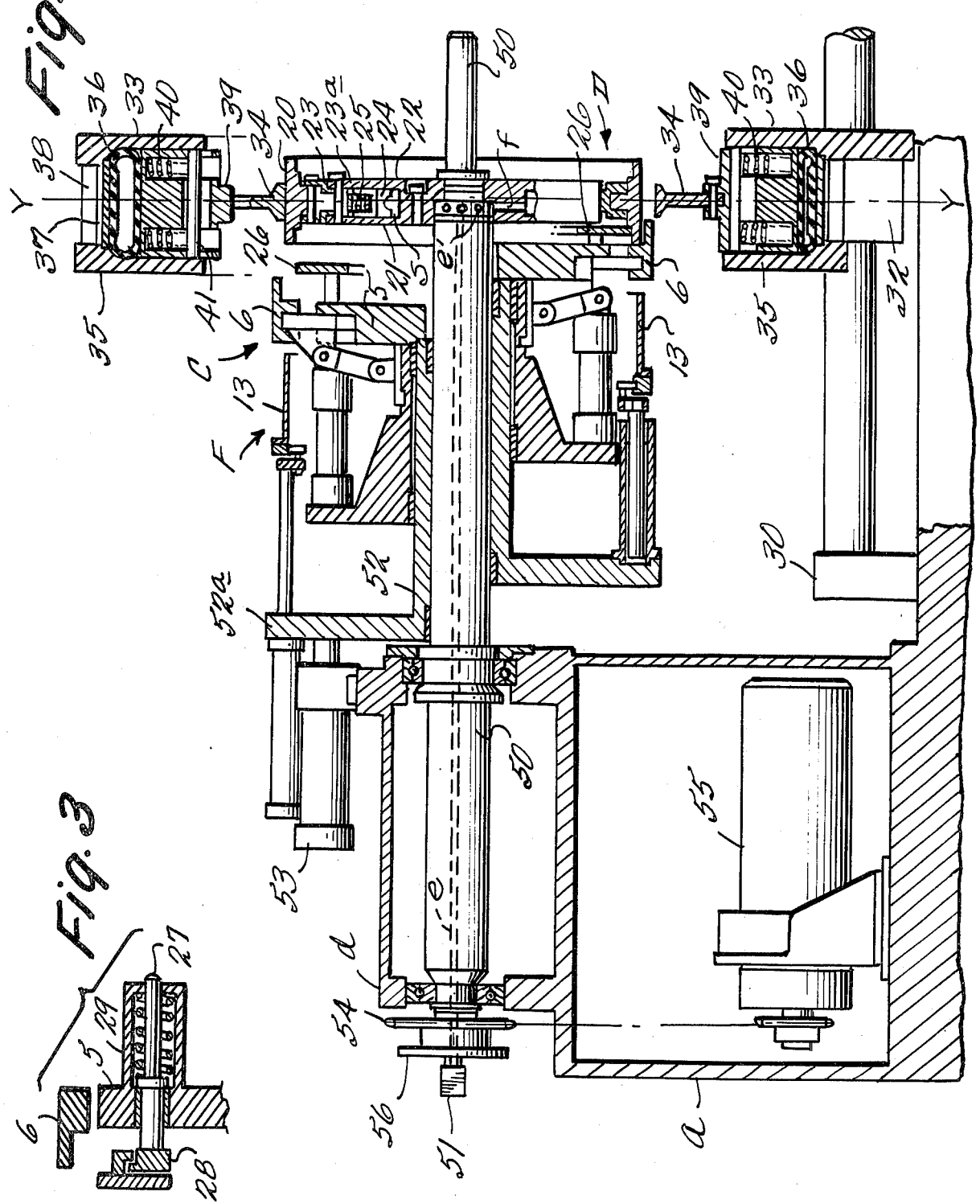

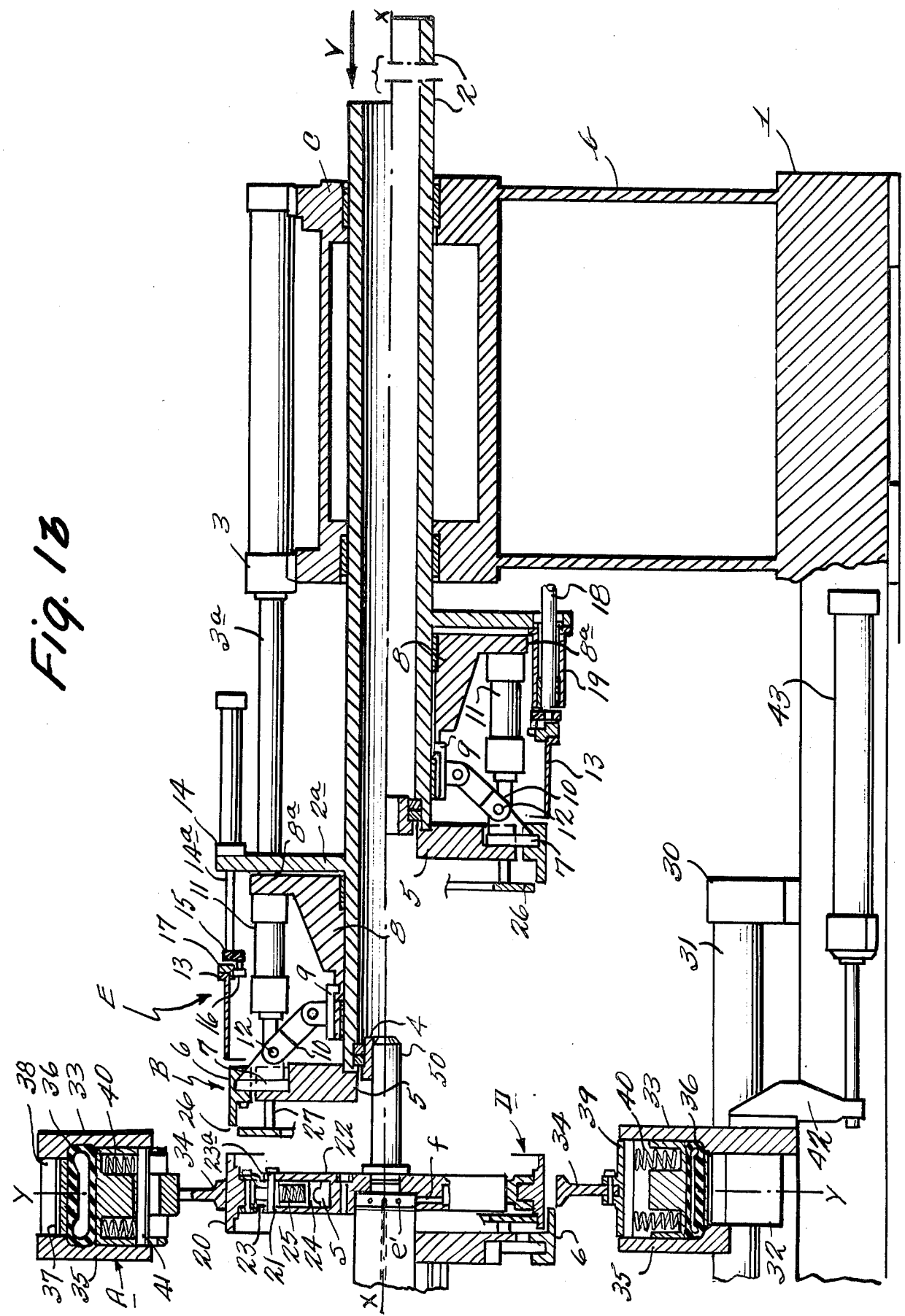

FORMING APPARATUS FOR A BREAKER LAYER TO BE USED IN A RADIAL TIRE

FIELD OF THE INVENTION

The present invention relates to a novel forming apparatus for a breaker layer to be used in a radial tire.

BACKGROUND OF THE INVENTION

Generally in a radial tire, a cord in a breaker layer which is one of important reinforcement members has free edges at the opposite end portions in the widthwise direction of the tire, so that upon rolling of the tire during running it is repeatedly bent due to unevenness of a road surface, and thereby the motion of said free edge portions within the rubber adversely affects upon durability of the tire. In practice, in the case of the heretofore known tires, there was a tendency that during running the breaker layer and carcass layer would separate from each other, so that the rubber joining the breaker layer and the carcass layer was often destroyed resulting in fast degradation of the outer shell of the tire, which made the tire unsuitable for use. As a provision for preventing a tire from degrading into such state, it has been already proposed that the breaker layer serving as a reinforcement member of a tire be constructed by laminating a plurality of breaker layers with one of the breaker layers being folded at the opposite end portions in the widthwise direction of the tire so as to wrap up the opposite end portions of the other breaker layers. This construction has been practically used with an excellent effect in durability at a high speed.

SUMMARY OF THE INVENTION

It is one object of the present invention to provide a novel forming apparatus for a breaker layer in a radial tire having the aforementioned construction.

According to one feature of the present invention there is provided a forming apparatus for a breaker layer in a radial tire, characterized in that said apparatus comprises a drum device D including a plurality of segments 20 which have a width of their outer circumferential surfaces approximately equal to the width of the breaker layer to be formed, which can form a substantially cylindrical press contact surface with their outer circumferential surfaces, and which can expand and contract the diameter of said cylindrical press contact surface; a press contact device A movable in an axial direction, including a plurality of segments 34 which can be displaced radially inwards and outwards, and which form a substantially cylindrical press contact surface with their inner circumferential surfaces concentrically with the cylindrical press contact surface of said drum device D when they are displaced inwards; first and second breaker material folding-wrapping devices B and C disposed symmetrically on the opposite sides of said drum device D and concentrically with said drum device D, each of which is movable in the axial direction and includes a plurality of segments 6 that can displace radially inwards and outwards; means for rotating said drum device D; and means for moving said respective devices A, B and C in the axial direction relative to said drum device D and for fixing them at predetermined positions.

According to another feature of the present invention, there is provided the above-featured forming apparatus for a breaker layer in a radial tire, characterized in that said apparatus further comprises first and second breaker material winding devices E and F disposed symmetrically on the opposite sides of said first and second breaker material folding-wrapping devices B and C and said drum device D and concentrically with said drum device D, each of which includes a cylindrical member 13 that is displaceable in the axial direction and rotatable about the axis of the drum device D; and means for moving said respective devices E and F in the axial direction relative to said drum device D and for fixing them at predetermined positions.

According to still another feature of the present invention, there is provided the above-featured forming apparatus for a breaker layer in a radial tire, characterized in that said apparatus further comprises means for holding the outer diameter of the substantially cylindrical press contact surface formed by the outer circumferential surface of the respective segments of said drum device D at a predetermined magnitude during the forming process of the breaker layer by means of said drum device D and said press contact device A, said diameter holding means being mounted on said first and second breaker material folding-wrapping devices B and C and being movable in the axial direction and rotatable about the axis relative to said respective devices B and C.

BRIEF DESCRIPTION OF THE DRAWINGS

Above-mentioned and other features and objects of this invention will become more apparent by reference to the following description taken in conjunction with the accompanying drawings, in which:

FIGS. 1(a) and 1(b) jointly show, when connected along line Y—Y, one preferred embodiment of the present invention in longitudinal cross-sections, FIG. 3 is a partial schematic cross-section view showing the mode of mounting annular members in the devices B and C.

DETAILED DESCRIPTION

Figure 2:
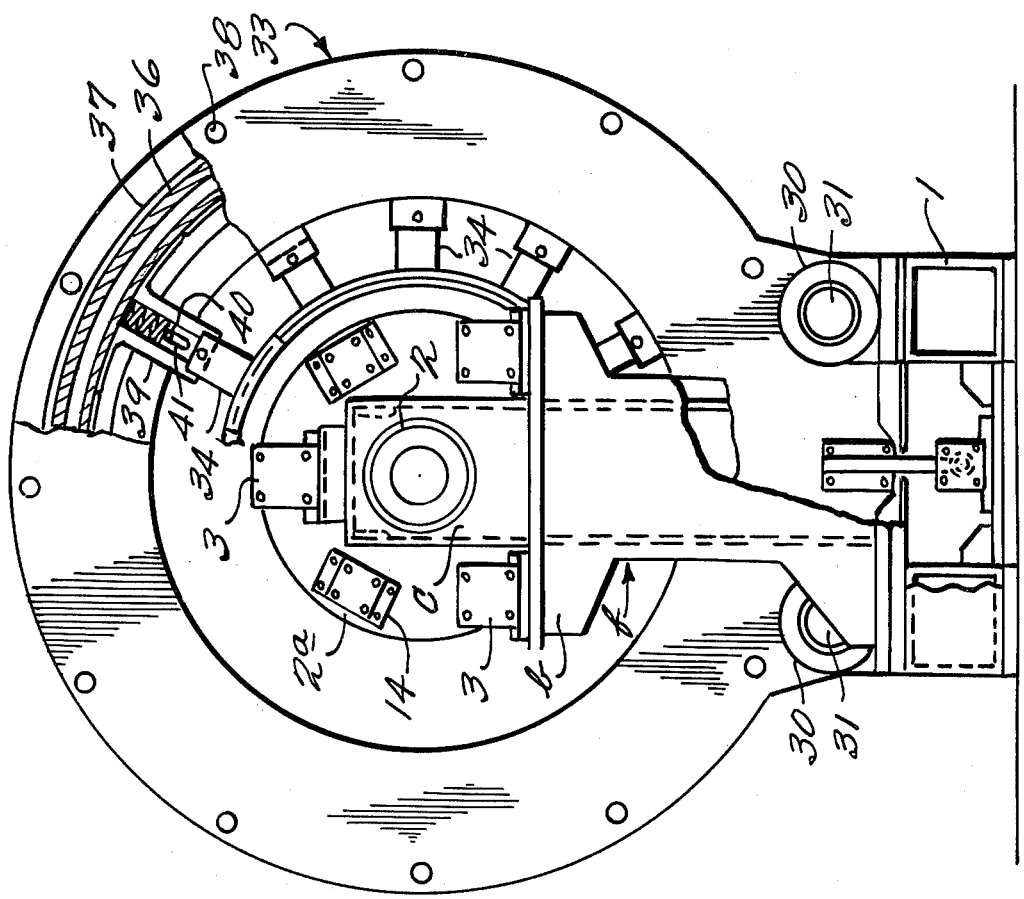
FIG. 2 is an end view partly cut away of the apparatus shown in FIG. 1 as viewed in the direction of an arrow V.

Referring now to FIGS. 1(a) and 1(b) of the drawings, one preferred embodiment of the present invention is illustrated in different four states at the respective quadrants bounded by dashdot lines X—X and Y—Y. In the first quadrant above the line X—X and on the right side of the line Y—Y, is shown the state where the breaker material folding-wrapping device and the breaker material winding device are moving towards the drum device for loading breaker material on the drum device. In the second quadrant above the line X—X and on the left side of the line Y—Y, is shown the state where the breaker material is being bent by the breaker material folding-wrapping device after the breaker material has been wound around the drum device. In the third quadrant under the lined X—X and on the left side of the line Y—Y, is shown the state where the bent breaker material is being further folded back so as to wrap up other breaker material. In the fourth quadrant under the line X—X and on the right side of the line Y—Y, is shown the state of the breaker material folding-wrapping device and the breaker material winding device after the forming of a breaker layer has been finished and the breaker layer has been taken out. In addition, it is to be noted that in the upper half portion above the line X—X the drum device D is shown with its drum segments held in a contracted state, while in the lower half portion under the line X—X the drum device D is shown with its drum segments held in an expanded state forming a press contact surface having a predetermined outer diameter, and that in the upper half portion above the line X—X the press contact device A is shown with its segments radially inwardly contracted, while in the lower half portion under the line X—X the press contact device A is shown with its segments radially outwardly expanded.

In FIGS. 1(a) and 1(b), reference character a designates a headstock standing on a base frame 1 that is fixedly mounted on a base as shown in the figures, and in the boss d of the headstock is rotatably mounted a headstock shaft 50 with its axis aligned with the center axis X—X of a tail stock shaft 2 as described later. This headstock shaft 50 has a fluid passageway e in its inner portion, one end of said fluid passageway e being connected to a pressurized fluid source not shown via a fluid joint 51 mounted at the outermost end of said shaft 50, and the other end of the fluid passageway e opens at openings e' in the proximity of the mounting position of a drum device D (this device being described later) at the innermost end of said shaft 50. Said openings e' are connected to a pressurized air chamber (gap space S) within said drum device D after the drum device D has been mounted on the headstock shaft 50, and in the connecting portion is interposed known sealing means for preventing leakage of the pressurized air. Reference numeral 52 designates a sleeve that is mounted on the extension of the headstock shaft 50 inside of the boss d slidably in the axial direction, and at the end of said sleeve 52 on the side of the boss d is provided a flange 52a, to which is fixedly secured a tip end of a piston rod 53a of a hydraulic cylinder 53 fixedly mounted at an appropriate position of the boss d, so that the sleeve 52 may be made to slide along the headstock shaft 50 in its axial direction by the actuation of said hydraulic cylinder 53. The sleeve 52, flange 52a and hydraulic cylinder 53 jointly form means for moving a second breaker material folding-wrapping device C as will be described later, in the axial direction and for fixing it at a predetermined position. Reference numeral 54 designates a sprocket fixedly secured to an appropriate position on the extension of the headstock 50 outside of the boss d, and between said sprocket 54 and another sprocket mounted on an output shaft of a rotary driving device 55 that is fixedly mounted within the headstock a, is stretched an endless chain. Reference numeral 56 designates a known one-revolution control device mounted of the headstock shaft 50 adjacent to said sprocket 54, and said control device 56 is adapted to make the headstock shaft 50 rotate precisely by one revolution and then to stop it as is well-known in the art.

Reference character b is a tail stock standing on the base frame 1 as opposed to the headstock a as shown in FIGS. 1(a) and 1(b), and in the boss c of the tail stock is mounted a cylindrical tail stock shaft 2 so as to be slidable in the axial direction with its axis aligned with the center axis X—X of the headstock shaft 50. Said tail stock shaft 2 has a flange 2a at an appropriate position on its outer circumference as shown in the figures, and the flange 2a is connected to a piston rod 3a of a hydraulic cylinder 3 that is fixedly mounted on said tail stock b, so that the tail stock shaft 2 may be made to slide in the direction of said center axis X—X by the extension and contraction of the piston rod 3a caused by the actuation of said hydraulic cylinder 3. The above-described tail stock shaft 2, flange 2a and hydraulic cylinder 3 jointly form means for moving a first breaker material folding-wrapping device B, as will be described later, in the axial direction and for fixing it at a predetermined position.

Reference numeral 4 designates a bush that is rotatably mounted on the inner circumference of the inner end portion of said cylindrical tail stock shaft 2. When the piston rod 3a of the hydraulic piston 3 extends up to its maximum stroke, the inner end portion of the headstock shaft 50 fits into said bush 4 and thereby the headstock shaft 50 and the tail stock shaft 2 are connected to each other, and when the piston rod 3a contracts, the respective shafts 50 and 2 are disconnected from each other. Reference numeral 5 designates a disk fixedly secured to the inner end portion of the tail stock shaft 2, and in the outer circumferential portion on the backside surface of said desk 5 are provided a plurality of T-shaped guide slots (not shown) radially at an equal angular interval about the axis X—X. Reference numeral 7 designates a plurality of slide blocks slidably fitted in the respective guide slots and having segments 6 mounted thereon, numeral 8 designates another sleeve provided around the outer circumference of the tail stock shaft 2 so as to be slidable in the axial direction on the inner side of the flange 2a of said shaft 2 as shown in FIG. 1(b), numeral 9 designates a clevis fixedly mounted on said sleeve 8, and said clevis 9 is connected to each slide block 7 by a pin 17 via one of a plurality of links 10 (the same in number as said slide blocks 7). Reference numeral 11 designates a plurality of hydraulic cylinders having their base portions fixed to the flange 8a of said sleeve 8, and the respective tip ends of the piston rods of these cylinders are connected to said disk 5. By actuating said respective hydraulic cylinders synchronously, the respective slide blocks 7 can be expanded and contracted in synchronism radially along the radial guide slots. Accordingly, the respective segments 6 mounted on these slide blocks 7, respectively, are also expanded and contracted in synchronism radially outwards and inwards. The above-described disk 5, segments 6, slide blocks 7, sleeve 8, clevises 9, links 10 and hydraulic cylinder 11 form a first breaker material folding-wrapping device B. Reference character C designates a second breaker material folding-wrapping device mounted on the sleeve 52 around the headstock shaft 50 as shown in FIG. 1(a), and said device C is constructed exactly in the same manner as said first breaker material folding-wrapping device B and is disposed at a position symmetrical to said first breaker material folding-wrapping device B with respect to the drum device D as fully described later.

Reference numeral 14 designates a plurality of hydraulic cylinders mounted on an outer circumferential portion of the flange 2a of the tail stock shaft 2 at an equal interval along the circumferential direction, and at the tip ends of the respective piston rods 14a of these hydraulic cylinders 14 is fixedly secured an annular plate 15 as shown in FIG. 1(b). Reference numeral 16 designates a plurality of rollers mounted on the outside of said annular plate 15 at an equal interval along the circumferential direction, numeral 17 designates a ring having an annular groove on its inner circumferential surface, and said ring 17 is rotatably supported by said respective rollers 16 with said annular groove engaged with said rollers 16. Reference numeral 13 designates a cylindrical member having its base portion detachably mounted on said ring 17, the inner diameter of said cylindrical member 13 being selected slightly larger than the outer diameter of the circle formed by the outer circumferential surfaces when said respective segments 6 are contracted to the radially innermost positions, and the outer diameter of said cylindrical member 13 is selected substantially equal to the outer diameter of the drum device D as described later when the drum device D is fixedly held to have a predetermined diameter. Accordingly, said cylindrical member 13 can be advanced by the actuation of the hydraulic cylinder 14 when the respective segments 6 of the drum device D are contracted to the radially innermost positions, and said cylindrical member 13 can be freely rotated at any advanced position. The above-described cylindrical member 13, hydraulic cylinders 14, annular plate 15, rollers 16, ring 17, guide rod 18 and guide boss 19 form a first breaker material winding device E. The aforementioned hydraulic cylinders 14 form means for moving said device E in the axial direction and for fixing said device E at a predetermined position. It is a matter of fact that the same means is also provided for a second breaker material winding device F. As shown in FIG. 1(a), the device F is the second breaker material winding device mounted on the flange 52a of the flange 52 provided around the headstock shaft 50, and said device F is constructed in the same manner as the first breaker material winding device E and is disposed symmetrically to the first breaker material winding device E with respect to the drum device D on the opposite sides thereof.

Reference numerals 21 and 22 designate a pair of left and right end plates fixedly secured to the headstock shaft 50 as shown in FIGS. 1(a) and 1(b). On either one of the opposed side surfaces of these end plates 21 and 22 are provided a plurality of radial guide slots at an equal interval along its circumferential direction, and in the respective guide slots are fitted slide blocks 23 so as to be slidable radially inwards and outwards. Reference numeral 20 designates drum segments detachably mounted on the outer circumferential surfaces of the respective slide blocks 23, and the width of the outer circumferential surfaces of these drum segments 20 is shaped approximately equal to the width of the breaker layer to be formed. Reference numeral 24 designates a contractible and expansible annular packing interposed in the guide groove formed between the end plates 21 and 22, an annular gap space S being formed between the inner circumferential surface of said packing 24 and the outer circumferential surface at the bottom of said guide groove, and said gap space S is fluid-tightly communicated with the openings $e'$ of the pressurized fluid passageway $e$ of said headstock shaft 50 via fluid passageways $f$ in the end plate 21. Reference numeral 25 designates return springs mounted within the respective slide blocks 23 as shown in FIGS. 1(a) and 1(b), and the compression reaction force of said return spring 25 is received on one hand by the slide block 23, and on the other hand by a stopper 23a which penetrates through the slide block 23 and is fixed to said end plates 21 and 22. When the pressurized fluid is introduced into said gap space S via said fluid passageways $f$, the annular elastic packing 24 is expanded by said pressurized fluid against the resilient forces of the return springs 25, and in accordance with the expansion of the packing 24 the respective slide blocks 23 are uniformly displaced radially outwards along the guide groove between the respective end plates 21 and 22. When the pressurized fluid within said gap space S is removed, the respective slide blocks 23 are uniformly displaced radially inwards by the restoring forces of the return springs 25. Upon the radially inward or outward displacement of the respective slide blocks 23, the drum segments 20 mounted on these slide blocks 23 contract or expand radially in synchronism, and when the respective segments 20 have been expanded, the outer circumferential edge surfaces of the left and right annular members 26 as described later are inserted along the inner circumferential surfaces of the opposite circumferential edge portions of these drum segments 20, and subsequently when the respective drum segments 20 have been contracted, the drum segments 20 are pressed against the outer circumferential edge surfaces of the annular members 26 by the compression forces of said return springs 25, and thereby a substantially cylindrical press contact surface having a predetermined outer diameter can be formed by the outer circumferential surfaces of the drum segments 20.

As shown in FIG. 3, the annular member 26 is mounted on a ring 28 having its center on the axis X—X that is supported at a number of positions along its circumferential direction by rods 27 which are in turn slidably mounted on said desk 5, and the annular member 26 is freely rotatable about the axis X—X. In addition, the rod 27 is associated with a spring 29 so that said annular member 26 may be always shifted away from the disk 5. Therefore, after the annular members 26 have limited the contraction of the respective drum segments 20 as described above, even if the disk 5 tends to approach the disk 5, the advance of the disk 5 is not prevented and the rotation of the headstock shaft 50 is also not prevented, because said annular member 26 is resiliently supported by the disk 5 as described above and because it is freely rotatable.

The above-described end plates 21 and 22, slide blocks 23, annular elastic member 24, return springs 25, annular members 26 and drum segments 20 form a drum device D. In addition, the above-described annular members 26, rods 27, disks 5, rings 28 and springs 29 form means for holding the outer diameter of the substantially cylindrical press contact surface formed by the outer circumferential surfaces of the respective segments 20 of the drum device D at a predetermined magnitude during the forming process of the breaker layer by means of a drum device D and a press contact device A as described later.

Reference numeral 30 designates a pair of brackets fixedly mounted on the base frame 1 as shown in FIGS. 1(a) and 1(b), numeral 31 designates a guide rod supported between said pair of brackets 30 in parallel to said center axis X—X, numeral 32 designates a guide member supported on said guide rod 31 slidably in the axial direction, and on one side of the guide member 32 (on the right side in the illustrated embodiment) is fixedly mounted an annular plate 33. Reference numeral 35 designates an annular plate disposed in opposition to and in parallel to said annular plate 33 as spaced therefrom at an appropriate distance, numeral 37 designates a cylindrical member interposed between the inside surfaces of the outer circumferential edge portions of the respective annular plates 33 and 35 with its axis aligned to the center axis X—X, and these members 33, 35 and 37 are integrally jointed by fastening bolts 38 provided along the circumferential direction at an equal interval. Reference numeral 39 designates a plurality of slide blocks interposed between the respective plates 33 and 35 so as to be slidable radially inwards and outwards along a plurality of guide slots formed radially on one of said annular plates 33 and 35, and on the inner circumferential end surfaces of these slide blocks 39 are mounted segments 34. Reference numeral 36 designates a bladder interposed between the outer circumferential surfaces of said slide blocks 39 and the inner circumferential surface of said cylindrical member 37, numeral 40 designates return springs provided within the respective slide blocks 39, and the compression reaction force of the spring 40 is received on one hand by the slide block 39, and on the other hand by a pin 41 mounted between the respective plates 33 and 35. When pressurized fluid is supplied from a pressurized fluid source not shown into the bladder 36 and said bladder 36 expands, the respective slide blocks 39 are uniformly displaced radially inwards against the resilient forces of the return springs 40, whereas when the pressurized fluid within the bladder 36 is removed, the respective slide blocks 39 are uniformly displaced radially outwards by the compression reaction forces of the return springs 40. Upon the radially inward or outward displacement of the respective slide blocks 39, the respective segments mounted on the respective slide blocks 39 contract or expand radially in synchronism, and when these segments 34 contract, a substantially cylindrical press contact surface conformed to the substantially cylindrical press contact surface formed by the outer circumferential surfaces of the respective segments 20 of said drum device D, can be formed by the inner circumferential surfaces of the respective segments 34. Reference numeral 43 designates a hydraulic cylinder fixedly mounted at an appropriate position on the base frame 1, a bracket 42 mounted at the tip end of the piston rod of the hydraulic cylinder 43 being fixedly secured to said annular plate 33, so that the annular plate assembly 33 and 35 including said bladder 36, slide blocks 39 and segments 34 can be displaced in parallel to the center axis X—X by the intermediary of the guide member 32 which can slide along the guide rod 31 by actuating said hydraulic cylinder 43, and also said annular plate assembly can be stopped and restarted at any arbitrary position. The above-described segments 34, annular plates 33 and 35, cylindrical member 37, bladder 36, slide blocks 39, return springs 40, guide rod 31, guide member 32 and hydraulic cylinder 43 jointly form a press contact device A movable in an axial direction including a plurality of segments which can be displaced radially inwards and outwards and which form a substantially cylindrical press contact surface with their inner circumferential surfaces concentrically with the cylindrical contact surface of said drum device D.

In addition, the above-described brackets 30, guide rod 31, guide member 32, bracket 42 and hydraulic cylinder 43 jointly form means for moving the press contact device A in the axial direction relative to said drum device D and for fixing the press contact device A at a predetermined position.

The illustrated embodiment of the present invention is constructed as described above, and now explanation will be made on the process of forming various types of breaker layers by means of the apparatus according to the present invention.

Figure 4:
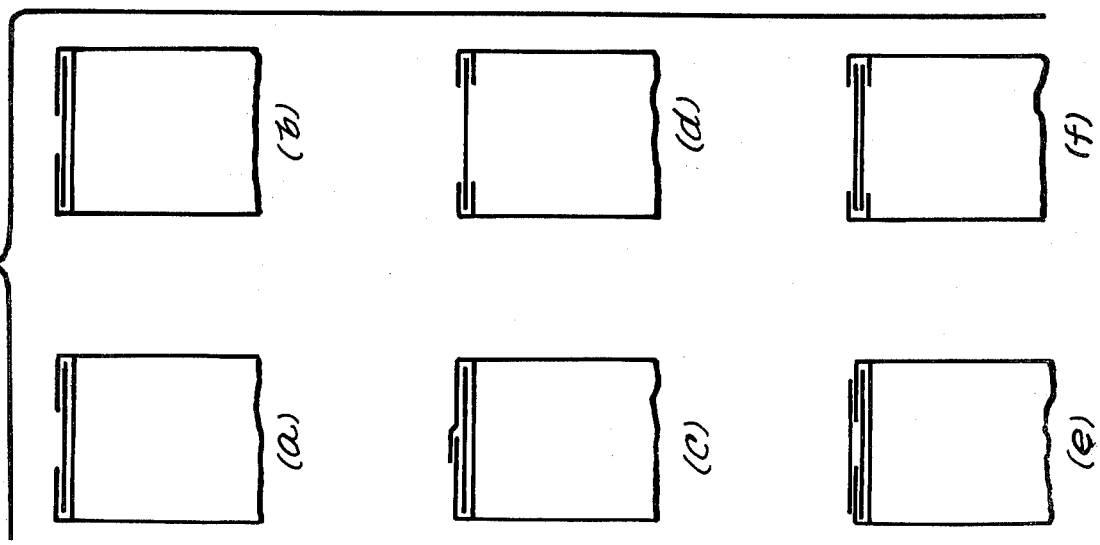
FIGS. 4(a) to 4(f) are transverse cross-section views showing examples of various types of breaker layers having folding-wrapping portions at the opposite side edge portions of breaker material, and FIGS. 5(1) to 5(9) are schematic views for explaining the forming process of the breaker layer of the type shown in FIG. 4(a).

In general, with respect to breaker layers for use in radial tires, the types of the breaker layers formed by folding back the opposite side portions of the breaker material are grouped into the following 5 groups:

a. The opposite side edge portions of cylindrical breaker material are folded to the outside, and the sum of the folded back widths is smaller than the entire width dimension of the breaker layer (See FIG. 4(a)).

b. The breaker material is folded similarly to the above, but the sum of the folded back widths is substantially equal to or larger than the entire width dimension of the breaker layer (See FIGS. 4(b) and 4(c).

c. The opposite side edge portions of breaker material are folded inwardly, and the sum of the folded back widths is smaller than the entire width dimension of the breaker layer (See FIG. 4(d)).

d. The breaker material is folded similarly to the case (a) above, and further breaker material is overlapped on the folded breaker material (See FIG. 4(e)).

e. The construction is similar to the case (d) above, but the inner breaker material is formed in double layers (See FIG. 4(f)).

Figure 5:
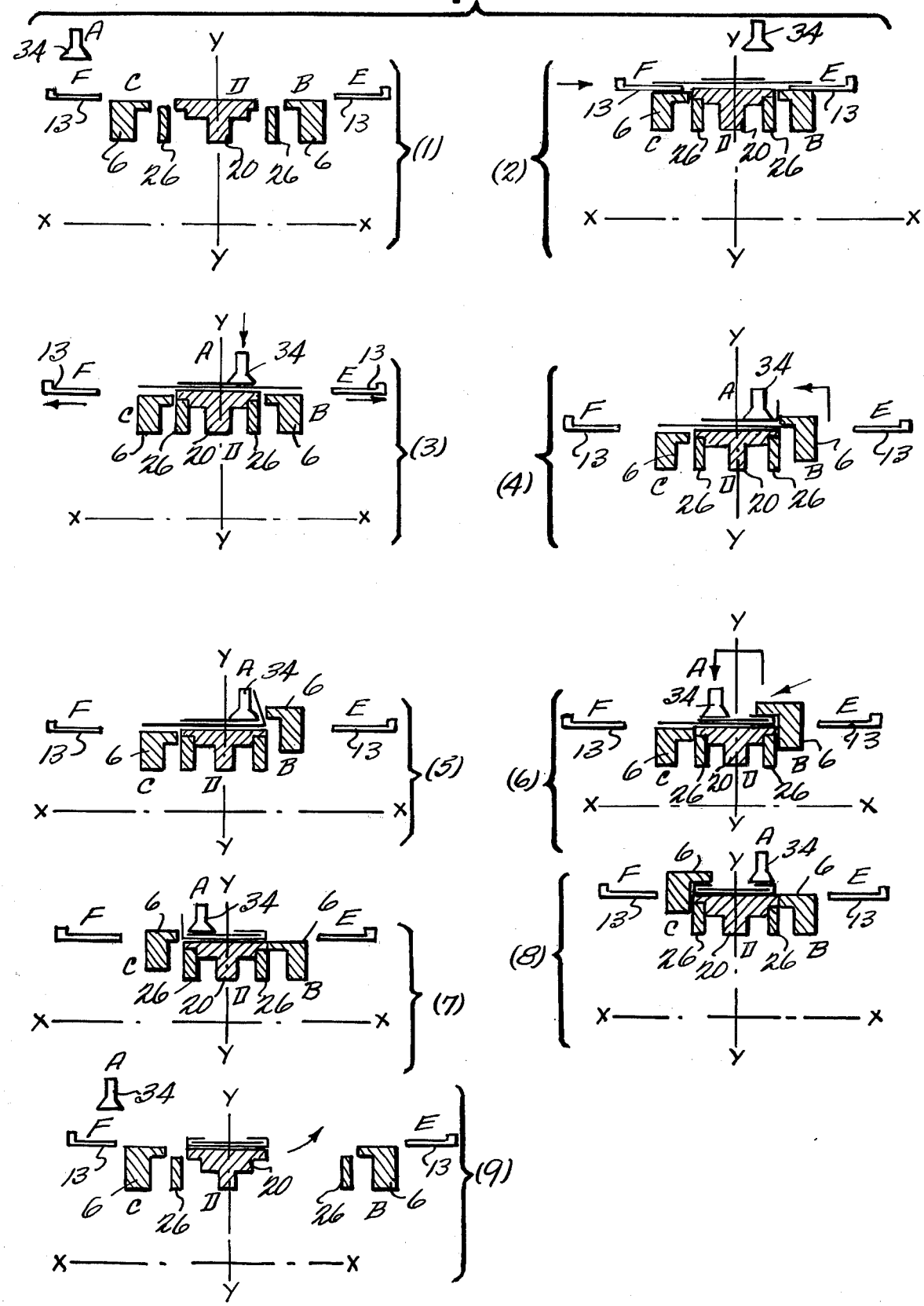

Now the sequence of the steps in the process of forming a breaker layer of the type (a) above by means of the apparatus according to the present invention, will be described with reference to FIGS. 5(1) to 5(9), but with respect to other examples of the breaker layers, the explanation on the forming process will be omitted.

i. Step of preparation for loading breaker material:

In this step, as shown in FIG. 5(1), the respective drum segments 20 of the drum device D are contracted radially inwardly, and the respective segments 34 of the press contact device A are kept away from the drum device D so that they may not become obstacles upon receiving the breaker material.

On the other hand, a pair of first and second breaker material folding-wrapping devices B and C on the left and right sides are kept in a stand-by state while being brought near to the drum device A up to such position that the devices B and C may not interfere with the annular members 26 on the left and right sides, and the first and second breaker material winding devices E and F on the left and right sides, respectively, are preset by the respective actuating means so as to be located at stand-by positions outside of the devices B and C, respectively.

ii. Step of expanding drum segments 20 of a drum device D and loading breaker material:

In this step, as shown in FIG. 5(2), pressurized air is supplied into the gap space S within the drum device D to displace the respective drum segments 20 radially outwards, and after the outer diameter of the substantially cylindrical press contact surface formed by the outer circumferential surfaces of these drum segments 20 has been expanded sufficiently larger than that of the annular members 26 of the drum device D, the devices B and C are brought near to the drum device D, so that the respective segments 6 of these devices B and C are placed adjacent to the respective drum segments 20. Subsequently, pressurized air is removed from the gap space S of the drum device D to displace the respective drum segments 20 radially inwards. Then, these drum segments 20 have the lower surfaces of their opposite side edge portions supported by the outer circumferential edge surfaces of the left and right annular members 26 owing to the action of the return springs 25, so that a substantially cylindrical press contact surface having a predetermined outer diameter is formed by the outer circumferential surfaces of the drum segments 20.

Nextly, after it has been confirmed that the respective segments 6 in the devices B and C are in a contracted state, the first and second breaker material winding devices E and F on the left and right sides, respectively, are brought near to the drum device D, and the cylindrical members 13 of these devices E and F are urged against the side surfaces of the respective drum segments 20. Then, a cylindrical surface having a long width, whose outer diameter is identical to that of the substantially cylindrical press contact surface formed by the outer circumferential surfaces of the respective segments 20 of the drum device D, can be formed. Here, first breaker material is wound around the cylindrical surface, and upon winding the breaker material it is only necessary to rotate the headstock shaft 50. In this case, since said shaft 50 can be stopped exactly at the starting angular position for winding owing to the action of the one-revolution control device 54, the winding of the breaker material around said cylindrical surface can be carried out precisely and easily. Then, it is a matter of course that the left and right cylindrical members 13 are also rotated and stopped simultaneously.

Nextly, second breaker material is wound around the outer circumference of the first breaker material wound around the above-described cylindrical surface in the aforementioned manner, and upon winding of the second breaker material it is essential that the center lines of the respective breaker layers coincide with each other and also that the center lines of the respective breaker layers coincide with the center line of the drum segments 20. If a center line is preliminarily indicated on the surface of the breaker material, and if said center lines are aligned to each other by means of a light projector (not shown) for indicating the center line of the drum segments 20, then the breaker materials can be wound round precisely with the center lines of the respective breaker materials aligned to the center line of the drum segments 20.

Although not illustrated in the drawings, if the first and second breaker materials are provisionally wound around another breaker material winding drum and formed integrally, then the above-mentioned winding work becomes easier and more reliable.

After the operations of winding the first and second breaker materials around the cylindrical surface have been finished, the press contact device A is moved up to the position of the drum device D by means of the hydraulic cylinder 43 for the purpose of press-contacting the seam edges of each breaker material to each other and also the respective breaker materials to each other. In this case, it is a matter of course that the respective segments 34 of the press contact device A must be confirmed to be in their expanded state.

iii. Step of press-contacting breaker materials:

After the devices A, B, C, D, E and F have been brought to the state shown in FIG. 5(2) in the above-described step (ii), pressurized air is supplied into the bladder 36 of the press contact device A, to displace the respective segments 34 thereof radially inwards as shown in FIG. 5(3), and to thereby press-contact the first and second breaker materials wound on the respective segments 20 of the drum device D to each other. In this case, press contact of the seam edges of each of the first and second breaker materials to each other, is also achieved. After the press contact of the respective breaker materials to each other achieved by the segments 34 has been completed, the press contact device A is displaced to one side edge of the drum segments 20 as shown in FIG. 5(3), and again the breaker materials are subjected to press contact operation. At this moment, it is desirable to bring the press contact device A to such position that one side edge surfaces of the respective segments 34 of the press contact device A may be positioned inside of one side edge surfaces of the respective drum segments 20 by about the thickness of the first breaker material. After the press contact of the breaker materials by means of the respective segments 34 has been confirmed, the above-mentioned cylindrical members 13 on the left and right sides are displaced to the positions shown in FIG. 5(3), where the radially outward expansions of the respective segments 6 of the devices B and C are not prevented by the cylindrical members 13.

iv. Step of bending one side edge portion of the first breaker material:

While the devices other than the device B, i.e., the devices A, C, D, E and F are kept in the state in the above-described step (iii), the respective segments 6 of the device B are expanded radially outwards as shown in FIG. 5(4) to bend and expand one side edge portion of the first breaker material outwardly by means of these segments 6. And when the segments 6 have been expanded up to such positions that the inner diameter of the segments 6 becomes slightly larger than the outer diameter of the respective drum segments 20 as shown in FIG. 5(5), the side surfaces of the respective segments 6 are urged against one side edge surfaces of the respective segments 34. By this operation, the bent portion of the first breaker material can be fully bent, and one end portion of the second breaker material and the first breaker material are fully press-contacted to each other.

v. Step of wrapping the second breaker material by one side edge portion of the first breaker material:

While the respective devices other than the device B are kept in the state in the above-described steps (iii) and (iv), after the respective segments 6 of the device B have been retracted from the above-mentioned press contact position, these respective segments 6 are again expanded radially outwards. Subsequently, after the respective segments 34 of the press contact device A have been displaced to the side of the device C while maintaining the segments 34 expanded radially outwards, these segments 34 are again contracted radially inwards to press contact the other edge portion of the second breaker material to the first breaker material (See FIG. 5(6)). In this case, the relative positioning between the edge portions of the respective segments 34 and the edge portions of the drum segments 20 is chosen similarly to that described with respect to the step (iii) above.

Nextly, the respective segments 6 of the device B which took the expanded positions in the step (v) above, are displaced towards the drum device D while being contracted as shown in FIG. 5(6), and thereby one side edge portion of the first breaker material is folded around the second breaker material, and press-contacted thereto. The movements of the respective segments 6 in this case could be either linear as shown in FIG. 5(6) or stepwise.

vi. Step of bending the other side edge portion of the first breaker material:

This step is carried out by the device C in the same manner as the step (iv) above (See FIG. 5(7)).

In this case, during the step of bending the breaker material by means of the device C, the respective segments 6 in the device B could be their original positions at the start of the bending operation as shown in FIG. 5(7), or else they could be held at the positions in the state where the wrapping of the breaker material has been completed as shown in FIG. 5(6).

vii. Step of wrapping the second breaker material by the other edge portion of the first breaker material:

This step is also similar to the step (iv) above that is carried out by means of the device B except for the fact that this step is carried out by means of the device C as shown in FIG. 5(8), and therefore, more detailed description thereof will be omitted here.

However, it is to be noted that if the device B is in the state shown in FIG. 5(6) during the step of bending the first breaker material as described above, then the press contact device A could be kept away from the respective devices B, C and D, but if the device B is in the state shown in FIG. 5(7), then it is essentially necessary to bring the press contact device A into the state shown in FIG. 5(8) before starting the wrapping of the breaker material to fixedly hold the breaker material.

While the press contact operation by means of the respective segments 6 is sufficiently effective if the width of the folded back portions of the first breaker material is narrower than the length of the horizontal projections of the respective segments 6 of the device B and C, if it is wider than the length of the horizontal projections, then the part of the folded back portion that is not press-contacted could be urged by means of the respective segments 34 of the press contact device A.

viii. Step of removing the breaker layer:

Through the above-described steps (i) to (vii), the first breaker material and the second breaker material are press contacted to each other, the opposite side edge portions of the second breaker material is wrapped by and press-contacted to the opposite side edge portions of the first breaker material, and thereby a breaker layer can be formed. Removal of this breaker layer from the drum device D is carried out in the following manner. That is, at first pressurized air is supplied into the gap space S of the drum device D. In this case, if the supply of the pressurized air is controlled so that the force exerted upon the respective segments 20 of the drum device D radially outwards by the supplied pressurized air may be balanced by the resilient forces of the return springs 25, then the breaker layer is not subjected to stretch and also the pressure at the contact surfaces between the respective drum segments 20 and the annular members 26 is greatly reduced, so that the removal of the annular members 26 from the respective drum segments 20 becomes easier. Therefore, if pressurized air is introduced into the gap space S at an appropriate pressure and the devices B and C are displaced as shown in FIG. 5(9), then the left and right annular members 26 can be taken out of the drum device D.

Subsequently, if the pressurized air in the gap space S is discharged, then the respective drum segments 20 contact radially inwards by the action of the return springs 25 resulting in reduction of the outer diameter of the drum segments 20, so that the breaker layer can be easily removed out of the drum device D.

Through the above-described steps (i) to (viii), one cycle of forming of a breaker layer has been completed, and by repeating such cycles, desired breaker layers can be formed successively.

Since the apparatus according to the present invention has the above-described structures and functions, the present invention can realize the following practical advantages:

1. A breaker layer to be used in a radial tire, in which the opposite side edge portions of breaker material is wrapped up by the opposite side edge portions of other breaker material, can be press-contacted and formed quickly, reliably and rigidly regardless of the fiber material and properties of the breaker materials, and consequently, durability of a tire during high speed running of a vehicle can be improved.

2. Upon bending the breaker material, the bending operation can be achieved regardless of the amount of bending, i.e., the magnitude of the length of the folded back portion, and regardless of the direction of bending, so that press contact and forming of a breaker layer of every type having wrapping portions along the opposite side edges can be performed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Forming apparatus for a radial tire breaker layer, comprising:
    a drum device, said drum device including a plurality of angularly adjacent segments, each segment having means collectively providing a generally cylindrical radially outer surface that is approximately equal in width to the width of the breaker layer that is to be formed;
    a press contact device, said press contact device including a plurality of angularly adjacent segments, each segment having means collectively providing a generally cylindrical radially inner surface;
    means for radially outwardly expanding said drum device to increase the diameter of said radially outer surface, and for permitting the expanded drum device to contract;
    means for radially inwardly contracting said press contact device to decrease the diameter of said radially inner surface, and for permitting the contracted drum device to expand;
    means for axially displacing said press contact device between a first position wherein said radially inner surface is axially displaced from and does not surround said radially outer surface, and a second position wherein said radially inner surface circumferentially surrounds said radially outer surface;
    first and second breaker material folding-wrapping devices symmetrically, coaxially disposed adjacent respective axially opposite ends of said drum device, each breaker material folding-wrapping device, each breaker material folding-wrapping device including a plurality of angularly adjacent segments, the segments of each said breaker material folding-wrapping device collectively having means providing a generally cylindrical radially outer surface, a coaxially annular axially inner end surface and a radially inwardly, axially inwardly facing generally L-shaped shoulder;

means for moving the first and second breaker material folding-wrapping devices each axially and radially among a first condition wherein, when the drum device and press contact device are in the respective first positions thereof, the respective folding-wrapping device radially outer surface is generally no larger radially than the radially outer surface of said drum device and is displaced axially therefrom, a second condition wherein when the drum device and press contact device are in the respective second positions thereof, the respective folding-wrapping device is disposed closely adjacent a respective end of the drum device with the respective shoulder thereof disposed radially outwardly of said radially outer surface of said drum device, and a third condition wherein at least three layers of breaker material are squeezed between the respective shoulder and said radially outer surface of said drum device at the respective end of said drum device;

means for rotating said drum device about the longitudinal axis thereof; and means for maintaining the drum in said second position.

2. A forming apparatus for a breaker layer to be used in a radial tire as claimed in claim 4; characterized in that said apparatus further comprises first and second breaker material winding devices (E) and (F) disposed symmetrically on the opposite sides of said first and second breaker material folding-wrapping devices (B) and (C) and said drum device (D) and concentrically with said drum device (D), each of which includes a cylindrical member (13) that is displaceable in the axial direction and rotatable about the axis of the drum device (D); and means for moving said respective devices (E) and (F) in the axial direction relative to said drum device (D) and for fixing them at predetermined positions.

3. A forming apparatus for a breaker layer to be used in a radial tire as claimed in claim 2, characterized in that: said apparatus further comprises means for holding the outer diameter of the substantially cylindrical press contact surface formed by the outer circumferential surfaces of the respective segments of said drum device (D) at a predetermined magnitude during the forming process of the breaker layer by means of said drum device (D) and said press contact device (A), said diameter holding means being mounted on said first and second breaker material folding-wrapping devices (B) and (C) and being movable in the axial direction and rotatable about the axis relative to said respective devices (B) and (C).

* * * * *